United States Patent

[11] 3,597,000

| [72] | Inventors | Hermann Klaue<br>Av. des Planches 3, Montreux, Switzerland;<br>Karlheinz Kalberlah, Av. des Brayers 1,<br>Clarens, Switzerland; Alfred Cormann,<br>Oststr. 4, Remschield, Germany; Werner<br>Guntsche, Geschw. Schollstr. 32,<br>Remschield, Germany |
|---|---|---|
| [21] | Appl. No. | 821,265 |
| [22] | Filed | May 2, 1969 |
| [45] | Patented | Aug. 3, 1971 |
| [32] | Priority | Oct. 15, 1968 |
| [33] | | Germany |
| [31] | | P 18 03 076.7 |

[54] WHEEL WITH DISC BRAKE
10 Claims, 4 Drawing Figs.

[52] U.S. Cl. .................................................... 301/6 E,
301/12
[51] Int. Cl. .................................................... B60b 1/06
[50] Field of Search .......................................... 301/6, 12

[56] References Cited
UNITED STATES PATENTS

| 2,172,788 | 9/1939 | Christensen.................. | 301/6 X |
| 2,482,824 | 9/1949 | Alden........................... | 301/6 X |

FOREIGN PATENTS

| 878,784 | 10/1961 | Great Britain................. | 301/6 E |

Primary Examiner—Richard J. Johnson
Attorney—Michael S. Striker

ABSTRACT: A wheel with disc brake in which the housing of the disc brake is located in an annular space defined to one side of the spokes between the rim and the hub of the wheel and in which the brake housing is so connected to the hub that elastic deformations imparted to the spokes are not transmitted to the brake housing and heat developed in the brake is not directly transmitted to the wheel rim.

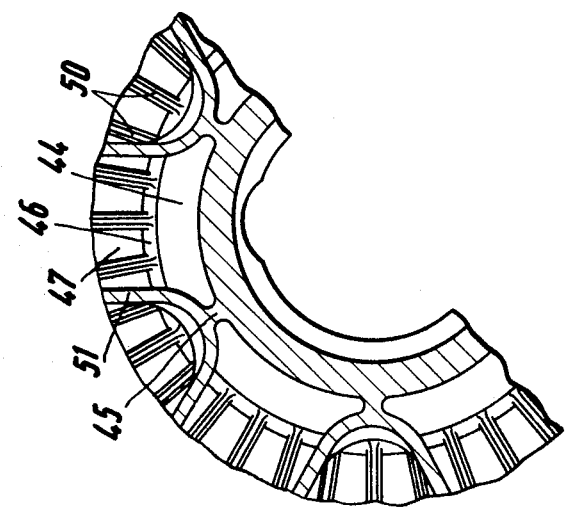
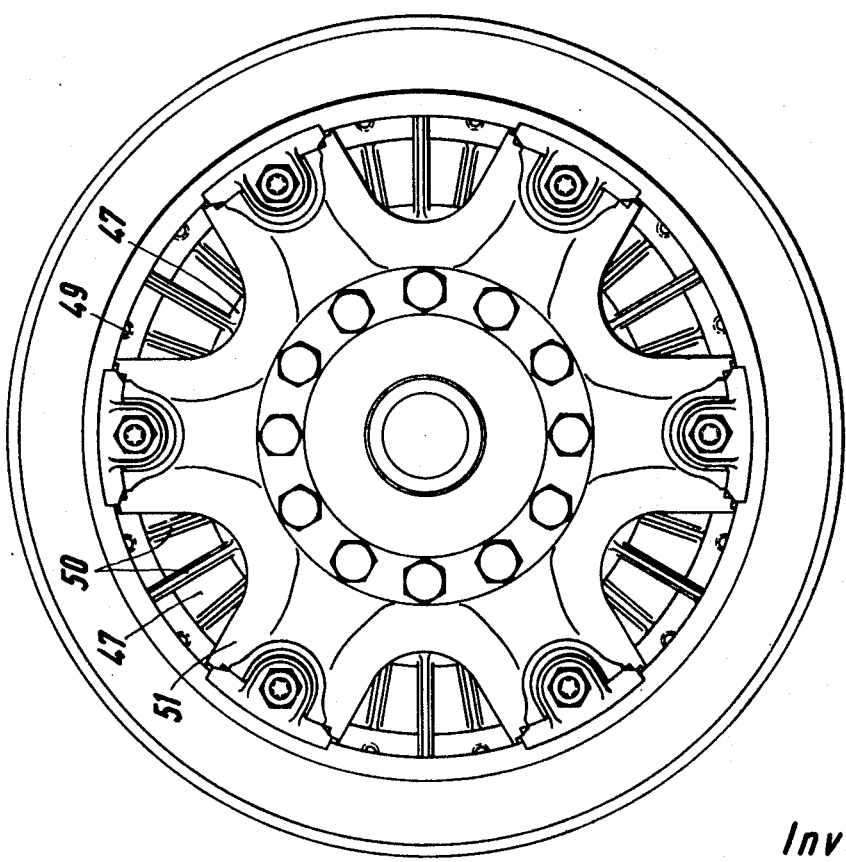

WHEEL WITH DISC BRAKE

BACKGROUND OF THE INVENTION

The present invention relates to a wheel for motor vehicles or the like which is provided with a disc brake and in which the body of the wheel, that is the wheel hub and the spokes thereof are formed together with part of the housing of the brake from a single casting and in which the aforementioned wheel body which carries the wheel rim is formed between its spokes with radially extending reinforcing ribs.

Wheels of this type are known in the art in which the wheel body which carries the wheel rim is provided between its spokes with radial reinforcing ribs and in which these ribs carry and reinforce at the same time the brake housing. The disadvantage of this construction is that all movements and elastic deformations of the wheel body are transmitted to the brake housing which may lead to undesired movements of the latter which will detrimentally affect proper brake action and which will also lead to a direct transmission of the heat developed during the braking action in the brake to the wheel rim. This in turn may create during heating up of the brake considerable tension in the casting, which may lead to cracking of the same.

SUMMARY OF THE INVENTION

It is an object of the present invention to overcome these disadvantages of cast wheels of the aforementioned kind known in the art. It is a further object of the present invention to provide a wheel in which the wheel body and part of the disc brake housing are cast in one piece and in which the casting is constructed in such a manner that even at maximum loading of the wheel, and the resulting elastic deformation of the wheel body, the brake housing part integrally cast with the wheel body will not be distorted.

With these objects in view, the wheel with disc brake according to the present invention mainly comprises a wheel body including a hub, a rim coaxial with the hub and spoke means supporting the rim on the hub with the rim overhanging at least in part the spoke means so as to form between the hub and the rim an annular space, disc brake means located in the annular space and including an annular brake housing part located substantially in a plane normal to the axis of the hub, and means supporting the annular brake housing part on the hub and including annular wall means substantially coaxially with and radially outwardly of the hub and integrally connected at one end to the inner periphery of the annular brake housing part, and transverse wall means extending transverse to the annular wall means and being integrally connected at opposite ends to the hub and to the other end of the annular wall means.

Preferably, the transverse wall means are reinforced by axially extending ribs and the annular brake housing part may also be provided with reinforcing ribs which at most extend up to the annular wall means.

The wheel body and the annular brake housing part are formed from a single casting whereby the heat developed in the brake will be taken up by the mass of the wheel body and the relative large surface of the latter may be used for dissipating the heat into the surrounding air.

In the construction according to the present invention, elastic deformations imparted to the wheel body by forces acting on the wheel rim will not be directly transmitted to the brake housing. The aforementioned annular brake housing part which is cast in one piece with the wheel body will also be reinforced by the pot-shaped cover bolted thereto, which will further counteract any deformation of the braking surfaces provided on the annular brake housing part and the end wall of the cover. The construction of the present invention provides for a resilient connection of the annular brake housing part and the wheel body, cast in one piece with the latter, which will prevent creation of excessive tensions and resulting cracks in the casting during creation of heat in the brake. In addition, the path of the heat flow from the brake to the outer ends of the spokes which are connected to the rim is lengthened which in turn will prevent an undue heating of the ends of the spokes.

In order to increase the stiffening effect obtainable from the brake housing cover it is preferred, according to a further feature of the present invention, that the aforementioned annular brake housing part, which forms a braking surface of the disc brake, is extended in radial direction beyond the braking surface and the cover has an annular wall abutting with an edge face thereof against the aforementioned radial extension. This construction will not only provide for a very rigid brake housing, but this construction also simplifies machining of the casting since the brake surface on the annular brake housing part may be in this construction very conveniently ground.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a side view of the rear wheel shown in FIG. 2; and

FIG. 4 is a cross section taken along the line IV-IV of FIG. 2.

DESCRIPTION OF THE PREFERRED EMBODIMENTS

Figure 1:
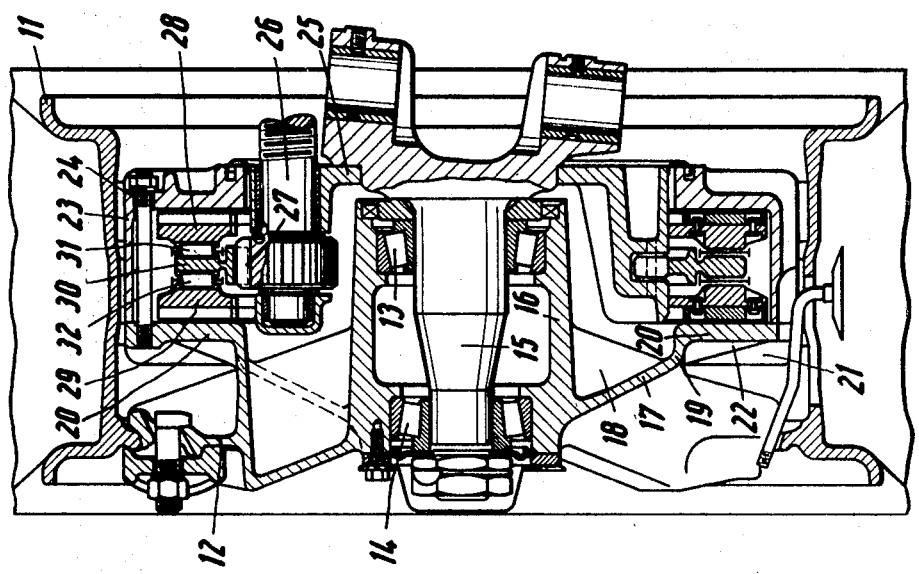
FIG. 1 is an axial cross section through a front wheel according to the present invention.

Referring now to FIG. 1 of the drawing, it will be seen that the wheel according to the present invention may comprise a star-shaped wheel body including a central hub 16 and a plurality of radially extending partly hollow spokes 12 to the outer ends of which the wheel rim 11 is connected in a known manner by screwbolts and connecting members, as shown in FIG. 1. The hub 16 is turnably mounted on the wheel axle 15 by means of roller bearings 13 and 14. According to the present invention an annular part 20 of the brake housing, which is located in the annular space between the wheel rim 11 and the hub 16 to one side of the spokes 12, is formed as one casting with the wheel body comprising the hub and the spokes. The annular part 20 is supported on the hub 16 by means of an annular wall means 19 arranged substantially coaxially with and radially outwardly of the hub 16 and integrally connected at one end to the inner periphery of the annular brake housing part 20, and transverse wall means 17 extending transverse to the annular wall means 19 and being integrally connected at opposite ends to the hub 16 and to the other end of the annular wall means 19, respectively. The transverse wall means 17, in the construction shown in FIG. 1, comprise a plurality of wall portions located between and integrally cast with the hollow spoke portions and being reinforced by a plurality of ribs 18 which, in the construction shown in FIG. 1, extend in axial direction up to a plane including the inner face of the annular brake housing part 20. The brake housing part 20 is reinforced and stiffened by a plurality of radially extending ribs 21 and 22 which extend only up to the annular wall means 19 and the ribs 20 and 21 end, as shown in FIG. 1, in the same region as the ribs 18 which reinforce the transverse wall means 17 so that in this region a nonreinforced wall portion is provided which permits a small relative movement between the wheel body and the annular housing part 20.

The annular housing part 20, which forms with a plane face thereof facing away from the spokes of the wheel a braking face, is extended in radial direction beyond the braking face to form a flange face for the pot-shaped cover 23 of the brake housing and the annular wall of the cover 23 abuts with its edge face thereof against the radial outermost portion of the annular brake housing part 20. The cover 23 is connected to the annular brake housing part 20 by a plurality of studbolts 24. The brake carrier 25, which is fixedly connected in any convenient manner, not shown, in the drawing, to the axle 15, carries a brake-actuating shaft 26 turnable about its axis with an actuating pinion 27 fixedly connected thereto, as well as a pair of annular brake discs 28 and 29 immovable in circumferential direction but freely movable in axial direction. The brake discs 28 and 29 are provided on the sides thereof respectively facing the annular brake housing part 20 and the end wall of the cover 23 with brake linings. The thickness of the brake discs 28 and 29 gradually and uniformly increases in circumferential direction so that the faces of the brake discs which face each other gradually approach each other in axial direction and an actuating ring 30 located between the brake discs 28 and 29 has a corresponding in circumferential direction gradually and uniformly increasing thickness, while the diameters of rollers 31 and 32 sandwiched between the central actuating ring and the outer brake discs correspondingly decrease. The actuating ring 30 is provided at its inner periphery thereof with a gear sector which meshes with the teeth of the pinion 27 so that during turning of the brake actuating shaft 26 in one direction the brake discs 28 and 29 are pressed with increasing force respectively against the annular brake housing part 20 and the end wall of the cover 23.

Figure 2:
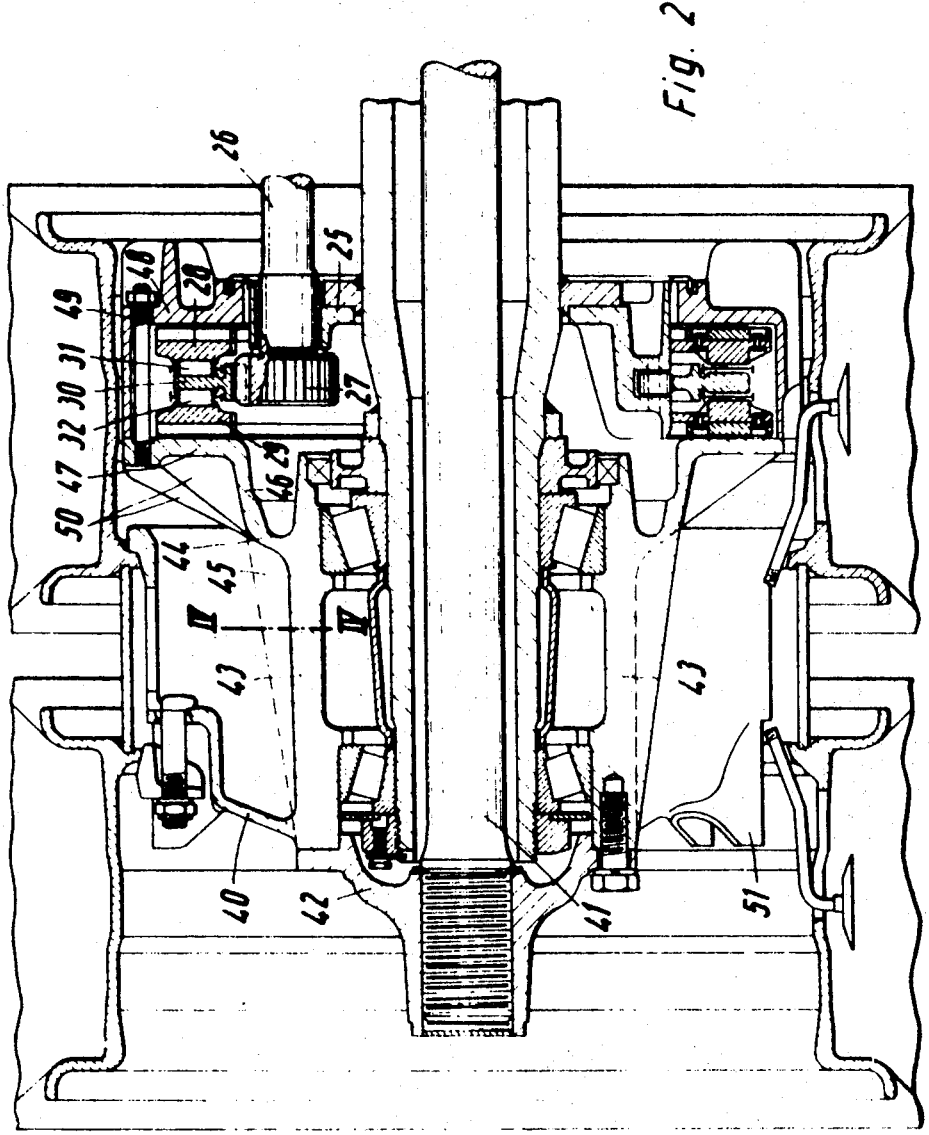
FIG. 2 is an axial cross section through a rear wheel according to the present invention.

According to FIG. 2, which illustrates the rear wheel of an automotive vehicle in axial cross section, the wheel body including the spokes 40 and the hub 43 is journaled by means of roller bearings on the shaft tube and is driven by the shaft 41 by means of the flange 42. The annular brake housing part 47 is mounted on the hub 43 by means of annular wall means 46 substantially coaxially with and radially outwardly of the hub 43 and integrally connected at one end to the inner periphery of the annular brake housing part 47 and transverse wall means 44, which in this construction are constituted by a ring, which is located substantially in one plane with an end face of the spokes 40. The ring 44 is reinforced by a plurality of axially extending ribs 45, whereas the annular brake housing part 47 is reinforced by a plurality of ribs 50 which extend also in this case only up to the annular wall means 46. Therefore, also in the construction as shown in FIG. 2, the weakest cross section of the connection between the annular brake part 47 and the hub 43 is provided at the transition between the wall means 44 and 46 so that in this region a relative movement between the wheel body, that is the spokes 40 and the hub 43 and the brake housing part 47 is made possible. The annular brake housing part 47 is again radially extended beyond its actual brake surface and the annular wall of the cover 48 is again held in abutment with the radial extension of the annular brake housing part 47 by a plurality of screw bolts 49. A pair of annular brake discs 28 and 29 movable in axial direction but immovable in circumferential direction are located in the brake housing formed by the annular brake housing part 47 and the cover 48 and the brake-actuating mechanism of the construction shown in FIG. 2 is identical with that shown in FIG. 1 and described above, whereby corresponding parts are designated FIG. 2 with the same reference numerals as in FIG. 1, so that a description of the brake actuating mechanism is not necessary.

FIG. 3 illustrates a side view of the rear wheel, shown in FIG. 2 in cross section, and FIG. 3 especially clearly shows the openings provided between lateral portions 51 of the spokes so that cooling air may pass through the spoke means into the interior of the wheel to impinge on the brake housing part 47 and the reinforcing ribs 50 provided thereon.

The cross section of FIG. 4 illustrates especially that the transverse wall means or ring 44, which is integrally connected with the hub, is reinforced by the ribs 45 which in turn also carry the wall portions 51 of the hollow spokes. The ring 44 is integral with the axially extending annular wall means 46 which in turn carries the annular housing part 47. The ribs 50 which reinforce the annular brake housing part 47 extend, as clearly shown in FIG. 4, only up to the axially extending wall means 46.

In the construction according to the present invention it is possible to cast the wheel body and the annular brake housing part 47 in one piece while at the same time substantially avoiding any distortion of the braking surface on the annular housing part during resilient deformation of the wheel body. At the same time, heat expansion of the annular brake housing part will, in the construction according to the present invention, not have any detrimental effect on the wheel body so that excess tensions and resulting cracks are avoided. In addition, the construction is simplified since screw connections between wheel body and brake housing are avoided.

It will be understood that each of the elements described above, or two or more together, may also find a useful application in other types of wheels with disc brakes differing from the types described above.

While the invention has been illustrated and described as embodied in a wheel with a disc brake in which part of the brake housing is cast in one piece with the wheel body, it is not intended to be limited to the details shown, since various modifications and structural changes may be made without departing in any way from the spirit of the present invention.

For instance the transverse wall means 17 shown in FIG. 1 may be formed as a continuous ring which either intersects the hollow spoke portions or closes the latter at the inner side thereof.

What We claim as new and desire to be protected by Letters Patent is set forth in the appended

1. A wheel with disc brake comprising, in combination, a wheel body comprising a hub and radially extending spoke means integral with said hub; a rim coaxial with said hub and supported by radially outer portions of said spoke means with said rim overhanging at least in part said spoke means so as to form to one side of the spoke means between said hub and said rim an annular space; disc brake means located in said annular space and including an annular brake-housing part located substantially in a plane normal to the axis of said hub axially spaced and completely separated from said radially outer portions of said spoke means; and means supporting said annular brake-housing part on said hub and including an annular wall means substantially coaxially with and radially outwardly of said hub and integrally connected at one end to the inner periphery of said annular brake housing part, and transverse wall means extending transverse to said annular wall means and being integrally connected at opposite ends to said hub and to the other end of said annular wall means, respectively, said wheel body, said brake-housing part, and said means supporting said annular brake-housing part on said hub being formed by a single casting.

2. A wheel as defined in claim 1, and including axially extending ribs reinforcing said transverse wall means, said ribs ending short of said annular wall means.

3. A wheel as defined in claim 2, wherein said annular brake housing part and said annular wall means are axially displaced to one side of said spoke means.

4. A wheel as defined in claim 3, and including a plurality of additional ribs reinforcing said annular brake housing part, said additional ribs extending at most up to said annular wall means so as to provide at the radial outer end of said annular wall means a nonreinforced wall portion permitting a small relative movement between said wheel body and said annular brake housing part.

5. A wheel as defined in claim 3, wherein said spoke means comprise a plurality of hollow spokes, and wherein said transverse wall means comprise a plurality of wall portions located between and integrally connected to said hollow spokes.

6. A wheel as defined in claim 3, wherein said transverse wall means are in form of a continuous ring.

7. A wheel as defined in claim 6, wherein said ring is located substantially in one plane with an end face of said spoke means.

8. A wheel as defined in claim 3, wherein said annular brake housing part forms a brake face, and wherein said brake means comprise further a cover forming an opposite brake face axially spaced from said first-named brake face, said cover having an annular wall abutting with an edge face thereof against a radial extension of said first-named brake face.

9. A wheel as defined in claim 8, wherein said brake means comprise further a pair of brake discs located in the space between said first and said opposite brake face, means mounting said pair of brake discs movable in axial direction toward and away from each other but immovable in circumferential direction, and actuating means cooperating with said brake discs for moving the same in axial direction in braking engagement with said brake faces.

10. A wheel as defined in claim 9, wherein said pair of brake discs are annular discs having each a thickness which gradually and uniformly increases in the circumferential direction, and wherein said actuating means comprises an actuating ring located between said brake discs and having also a thickness gradually and uniformly increasing in the circumferential direction, a plurality of rollers sandwiched between said brake discs and said actuating ring and having diameters which correspondingly decrease in said direction; and means to turn said actuating ring relative to said brake discs.